(12) United States Patent
Sato

(10) Patent No.: US 12,045,529 B2
(45) Date of Patent: Jul. 23, 2024

(54) DEVICE MANAGEMENT SERVER AND CONTROL METHOD THEREOF

(71) Applicant: CANON KABUSHIKI KAISHA, Tokyo (JP)

(72) Inventor: Junji Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/151,302

(22) Filed: Jan. 6, 2023

(65) Prior Publication Data
US 2023/0221908 A1 Jul. 13, 2023

(30) Foreign Application Priority Data

Jan. 13, 2022 (JP) ................................ 2022-003450

(51) Int. Cl.
*G06F 3/12* (2006.01)
(52) U.S. Cl.
CPC .......... *G06F 3/1288* (2013.01); *G06F 3/1203* (2013.01); *G06F 3/1224* (2013.01)
(58) Field of Classification Search
CPC ..... G06F 3/1203; G06F 3/1224; G06F 3/1288
See application file for complete search history.

(56) References Cited

U.S. PATENT DOCUMENTS

| | | | | |
|---|---|---|---|---|
| 2011/0235085 A1* | 9/2011 | Jazayeri | ................ | G06F 3/1238 358/1.14 |
| 2016/0277407 A1* | 9/2016 | Nakashima | ............. | G06F 21/00 |
| 2023/0359417 A1* | 11/2023 | Kamiya | ................... | B41J 29/38 |

FOREIGN PATENT DOCUMENTS

JP 2021028130 A 2/2021

* cited by examiner

*Primary Examiner* — John R Wallace
(74) *Attorney, Agent, or Firm* — Canon U.S.A., Inc. IP Division

(57) ABSTRACT

A device management server that cooperate with a print server accepts designation indicating that cooperation with the print server is to be performed when a printer to be purchased is used, manages authorization information acquired based on an operation performed using account information managed by the print server in association with account information on the management server side, and makes a request for registration of device information about the printer to be purchased with the print server, using the authorization information.

7 Claims, 12 Drawing Sheets

FIG. 4

| SERIAL NUMBER | USER ID | PURCHASE DATE | DELIVERY LOCATION | PRINT USER ID |
|---|---|---|---|---|
| AAA00001 | aaa@xyz.com | 2020/12/11 | TOKYO X-X-X | clouduser001 |
| AAA00002 | bbb@xyz.com | 2021/8/4 | TOKYO Y-Y-Y | clouduser002 |
| CCC00001 | ccc@xyz.com | 2021/10/28 | TOKYO Z-Z-Z | clouduser003 |

FIG. 5

| PRINTER ID | SERIAL NUMBER | SHARED PRINT USER ID | REDIRECT SETTING |
|---|---|---|---|
| cloudprinter001 | AAA00001 | clouduser001 | https://devicevender1.com/xxx |
| cloudprinter002 | AAA00002 | clouduser002 | https://devicevender1.com/xxx |
| cloudprinter003 | CCC00001 | clouduser003 | https://devicevender1.com/xxx |
| cloudprinter004 | XXXXX-0001 | clouduser002 | https://devicevenderXXX.com/xxx |
| cloudprinter005 | WJNDIOKKNSIA | clouduser003 | https://devicevenderYYY.com/xxx |

FIG. 6A

DEVICE VENDOR SITE: LOGIN

USER NAME: aaa@xyz.com

PASSWORD: ●●●●●●●

[ LOGIN ]  [ NEW REGISTRATION ]

FIG. 6B

DEVICE VENDOR SITE: MY PAGE          LOGGED IN: aaa@xyz.com

| DEVICE IN USE | NEW PRINTER PURCHASE | | |
|---|---|---|---|
| SERIAL NUMBER | STATUS | TONER REMAINING AMOUNT | PURCHASE DATE |
| AAA00001 | NORMAL | 60% | 2020/12/11 |

FIG. 6C

DEVICE VENDOR SITE: PURCHASE PAGE          LOGGED IN: aaa@xyz.com

DEVICE IN USE / NEW PRINTER PURCHASE

PRINTER TO PURCHASE: TYPE A

DELIVERY LOCATION: TOKYO XXX-xxx    [ CHANGE ]

USE OF CLOUD PRINT:
● YES ~601
○ NO

○ CREATE A NEW ACCOUNT WITH CLOUD PRINT ~602
● ALREADY HAVE AN ACCOUNT WITH CLOUD PRINT

PRESS THE FOLLOWING BUTTON AND
LOG IN TO CLOUD PRINT ~603

[ LOGIN ] ~604

FIG. 10

| SERIAL NUMBER | USER ID | USER TYPE | PURCHASE DATE | DELIVERY LOCATION | PRINT USER ID |
|---|---|---|---|---|---|
| AAA00001 | aaa@xyz.com | INDIVIDUAL | 2020/12/11 | TOKYO X-X-X | clouduser001 |
| AAA00002 | bbb@xyz.com | INDIVIDUAL | 2021/8/4 | TOKYO Y-Y-Y | clouduser002 |
| CCC00001 | ccc@xyz.com | INDIVIDUAL | 2021/10/28 | TOKYO Z-Z-Z | clouduser003 |
| DDD00001 | office@xyz.com | CORPORATE | 2021/11/3 | TOKYO A-B-C | cloudofficeuser001 |

FIG. 11

| PRINTER ID | SERIAL NUMBER | PRINT METHOD | SHARED PRINT USER ID | REDIRECT SETTING |
|---|---|---|---|---|
| cloudprinter001 | AAA00001 | PUSH | clouduser001 | https://devicevender1.com/xxx |
| cloudprinter002 | AAA00002 | PUSH | clouduser002 | https://devicevender1.com/xxx |
| cloudprinter003 | CCC00001 | PUSH | clouduser003 | https://devicevender1.com/xxx |
| cloudprinter004 | XXXXX-0001 | PUSH | clouduser002 | https://devicevenderXXX.com/xxx |
| cloudprinter005 | WJNDIOKKNSIA | PUSH | clouduser003 | https://devicevenderYYY.com/xxx |
| cloudprinter006 | DDD00001 | PULL | cloudofficeuser001 | https://devicevender1.com/xxx |

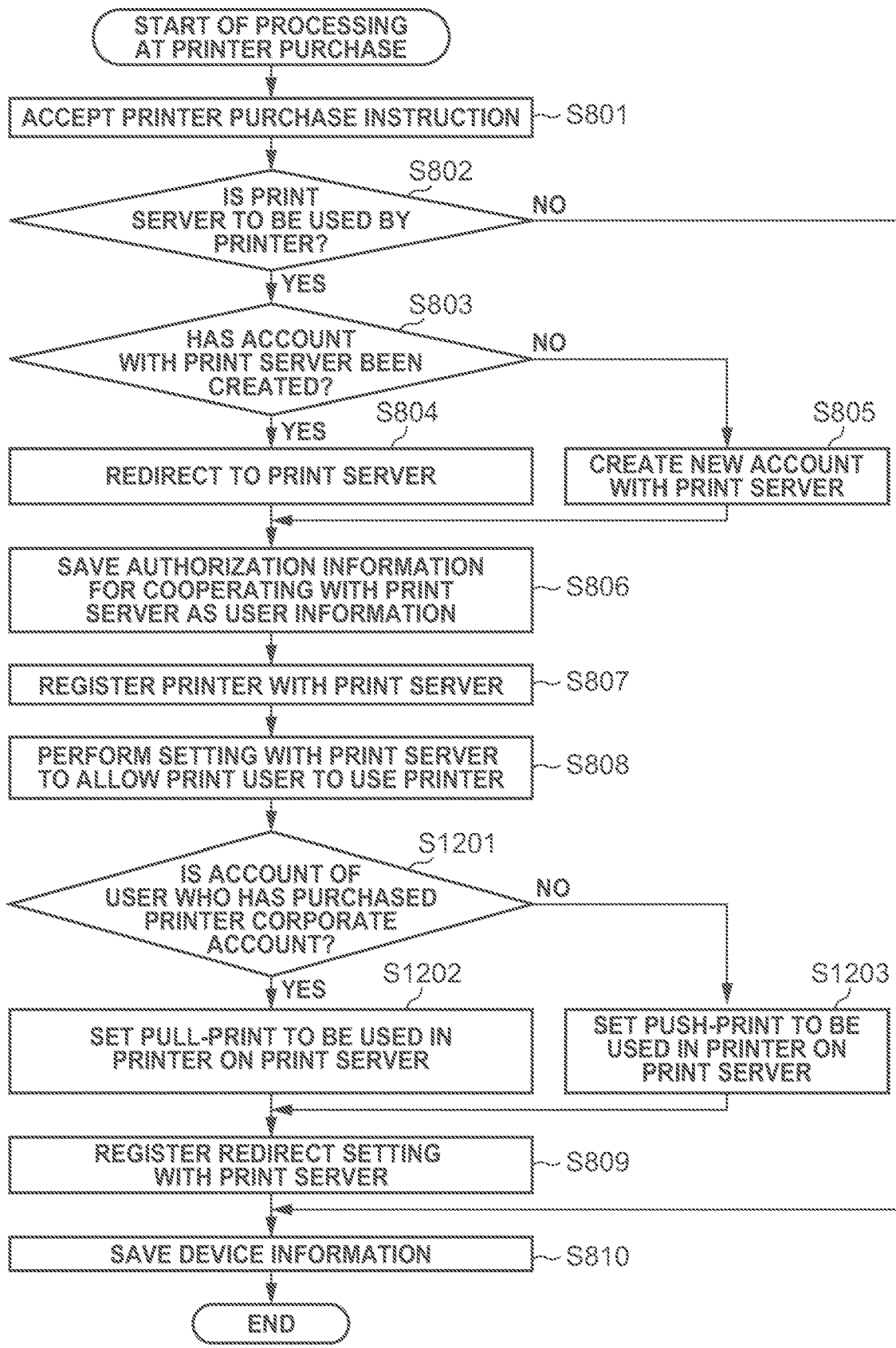

DEVICE MANAGEMENT SERVER AND CONTROL METHOD THEREOF

BACKGROUND

Field of the Disclosure

The present disclosure relates to a device management server and a control method thereof in a system that performs printing via a cloud service.

Description of the Related Art

With the spread of teleworking and remote working, cases where printers for individual use are introduced for business purposes have been increasing. Meanwhile, cloud print services have become widespread, and this type of service enables execution of printing by registering a printer with a cloud service and sending print data to the cloud service, without setting a printer driver or the like in a print instruction terminal.

It is desirable that the use status of a printer for business purposes be appropriately managed by an organization, but if the number of printers for individual use increases, the number of printers to be managed also increases, thereby increasing the load related to installation and management. In addition, in a case where a printer is installed in a place such as the home of a user, it is necessary for the user him/herself to carry out setup for remote management of the printer, which can be an obstacle to installing the printer depending on the information technology (IT) skill of the user.

As a method of reducing a management load when a cloud print service is used by a large number of printers, Japanese Patent Application Laid-Open No. 2021-28130 discusses a method of making settings in a screen of a printer, not on a management screen on the cloud. The settings are made in the screen of each printer, so that the possibility that an issue can occur in the settings of a shared range among the printers can be reduced.

In the technique of Japanese Patent Application Laid-Open No. 2021-28130, however, setup for each printer is still required, and thus it is necessary for a user him/herself to make settings in a printer for individual use.

SUMMARY

Embodiments of the present disclosure are directed to providing a device management system that can reduce a load in printer installation by automatically performing settings for a cloud print service based on information such as information available at the time of printer purchase.

According to embodiments of the present disclosure, a device management server configured to cooperate with a print server includes a first acceptance unit configured to accept an operation of purchasing a printer using first account information managed by the device management server, a second acceptance unit configured to accept designation indicating that cooperation with the print server is to be performed when the printer to be purchased is used, a management unit configured to manage authorization information acquired based on an operation performed using second account information managed by the print server in association with the first account information, and an execution unit configured to make a request for registration of device information about the printer to be purchased with the print server, using the authorization information, wherein, in a case where a print process using the purchased printer based on the second account information is executed in the print server, print information is transmitted from the print server to the device management server.

Further features of the present disclosure will become apparent from the following description of exemplary embodiments with reference to the attached drawings.

BRIEF DESCRIPTION OF THE DRAWINGS

FIG. 4 is a diagram illustrating an example of device information according to the first exemplary embodiment.

FIG. 5 is a diagram illustrating an example of printer information according to the first exemplary embodiment.

FIGS. 6A to 6C are diagrams each illustrating an example of an operation screen of the device management server according to the first exemplary embodiment.

FIG. 10 is a diagram illustrating an example of device information according to a second exemplary embodiment.

FIG. 11 is a diagram illustrating an example of printer information according to the second exemplary embodiment.

FIG. 12 is a flowchart illustrating an example of device management server processing at the time of printer purchase according to the second exemplary embodiment.

DESCRIPTION OF THE EMBODIMENTS

Exemplary embodiments of the present disclosure will be described below with reference to the drawings.

Figure 1:
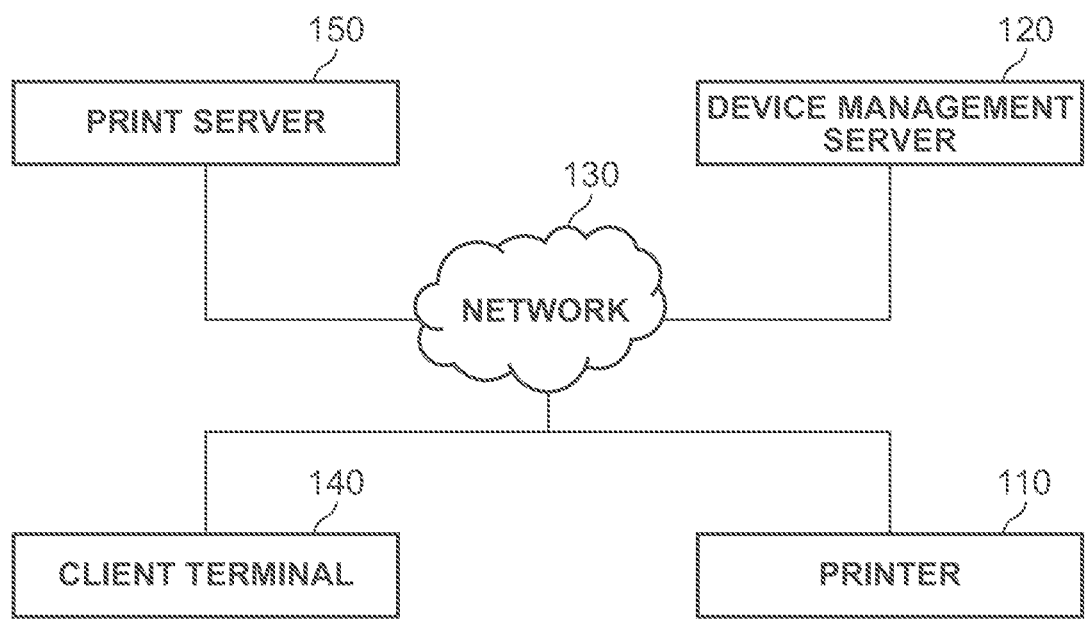
FIG. 1 is a diagram illustrating a configuration of an information processing system according to a first exemplary embodiment.

FIG. 1 is a diagram illustrating a configuration of an information processing system according to a first exemplary embodiment. The information processing system according to the present exemplary embodiment includes a printer 110, a device management server 120, a network 130, a client terminal 140, and a print server 150.

The printer 110 is connected to the device management server 120 and the print server 150 via the network 130 such as the Internet. The printer 110 is an image processing printer installed and used in a client organization or a home and having functions such as a print function and a network connection function, and may be, for example, a multifunction peripheral, a copier, or the like.

In FIG. 1, only one printer is illustrated as the printer 110, but there may be a plurality of printers 110 in one client organization or home. Further, printers 110 of a plurality of client organizations may be connected to one device management server 120.

The device management server 120 manages setting information and operation information acquired from a management target device. Examples of types of devices to be managed include an image processing apparatus such as a printer. Further, the device management server 120 receives print execution information from the print server 150, and manages the received information as information for each target device. In the present exemplary embodiment, a service provider of the device management server 120 may be a device vendor of the printer 110.

The client terminal 140 is a terminal that transmits print data to the print server 150, and is an information processing apparatus such as a personal computer (PC) or a smartphone.

The print server 150 manages print data received from the client terminal 140. Further, the print server 150 manages a printer and controls printing by transmitting print data to the printer. A service provider of the print server 150 may be different from the service provider of the device management server 120, and the print server 150 can perform cooperation using a mechanism of authentication authorization such as Open Authorization (OAuth). Further, the service provider of the print server 150 may be different from the device vendor of the printer 110. The service provider of the print server 150 may be a vendor of software implemented in the client terminal 140.

Figure 2:
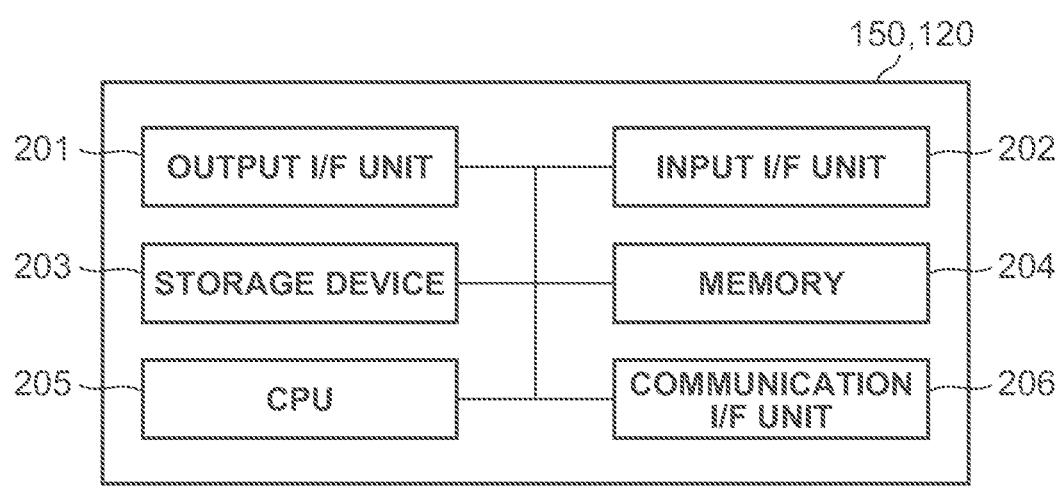
FIG. 2 is a diagram illustrating a hardware configuration of each of a device management server and a print server according to the first exemplary embodiment.

FIG. 2 is a diagram illustrating a hardware configuration of each of the device management server 120 and the print server 150 according to the present exemplary embodiment. In the server computer (each of the device management server 120 and the print server 150), an output interface (I/F) unit 201 is connected to an output device such as a display. An input I/F unit 202 is connected to an input device such a keyboard. The device management server 120 and the print server 150 may be provided using a cloud computing technology, or may be implemented by using hardware resources provided by a plurality of server computers.

A storage device 203 stores an operating system (OS) as well as an authentication program and a management program to be used in the device management server 120, registration information about the printer 110, setting information and operation information received from the printer 110, and the like. Here, the authentication program is a program that performs an authentication and connection process. The management program is a program for managing the registered printer 110.

A central processing unit (CPU) 205 loads the authentication program and the management program from the storage device 203 into a memory 204, and executes the authentication program and the management program. A communication I/F unit 206 is a network interface for controlling communication with the printer 110 via the network 130.

The diagram representing the hardware configuration illustrated in FIG. 2 is equivalent to a hardware block diagram of a typical information processing apparatus, and is also applied to the printer 110 and the client terminal 140 of the present exemplary embodiment. Thus, the printer 110 and the client terminal 140 each have a similar hardware configuration to that illustrated in FIG. 2, and thus the description thereof will be omitted.

Figure 3:
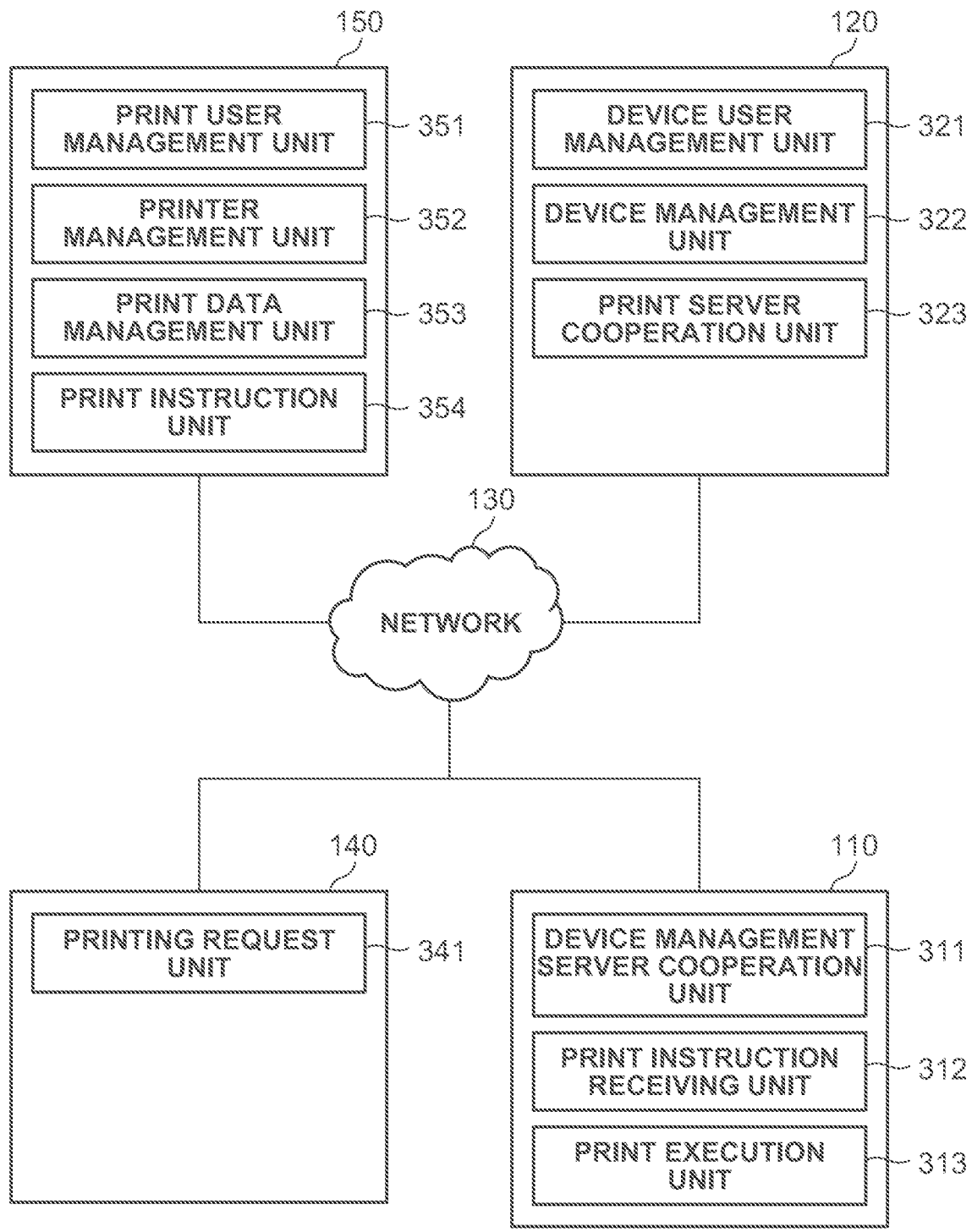
FIG. 3 is a block diagram illustrating main components of a printer, the device management server, a client terminal, and the print server according to the first exemplary embodiment.

FIG. 3 is a block diagram illustrating main components (components related to embodiments of the present disclosure) of the printer 110, the device management server 120, the client terminal 140, and the print server 150.

The printer 110 includes a device management server cooperation unit 311, a print instruction receiving unit 312, and a print execution unit 313. The device management server cooperation unit 311 registers information about the printer 110 itself with the device management server 120, and transmits information such as an operation status and a remaining amount of a consumable product of the printer 110 at predetermined timing. The print instruction receiving unit 312 receives a print instruction from the print server 150. The print execution unit 313 executes printing based on the content received by the print instruction receiving unit 312.

The device management server 120 includes a device user management unit 321, a device management unit 322, and a print server cooperation unit 323. The device user management unit 321 manages user information about a user who uses the device management server 120. The device management unit 322 manages information about the printer 110. The print server cooperation unit 323 registers print user information and device information with the print server 150 and sets authorization to use a device for a print user, so that the user managed by the device user management unit 321 can access the print server 150. Further, the print server cooperation unit 323 performs settings for transferring print information when the print server 150 is used to the device management server 120.

The client terminal 140 includes a printing request unit 341. The printing request unit 341 designates the printer 110 registered in the print server 150, and transmits a printing request to the print server 150. The printing request unit 341 can make a request for printing using data stored in the client terminal 140, using an application or a web browser operating on the OS.

The print server 150 includes a print user management unit 351, a printer management unit 352, a print data management unit 353, and a print instruction unit 354. The print user management unit 351 manages user information about a user who uses the print server 150. The printer management unit 352 manages information about an image processing apparatus, such as the printer 110, which uses the print server 150. The print data management unit 353 receives print data from the client terminal 140 and manages the received print data. The print instruction unit 354 transmits a print instruction and print data to the printer 110 based on a printing request received from the client terminal 140.

FIG. 4 is a diagram illustrating an example of device information managed by the device management unit 322.

A serial number is an identifier granted to a printer to uniquely identify the printer. A user identification (ID) is an identifier of a user who has purchased the printer. A purchase date is the date of the purchase of this printer. A delivery location is an address to which the printer is delivered. A print user ID is a user ID (a user account) for the user to access the print server 150.

The device information in FIG. 4 is created when a user logs in to the device management server 120 and purchases a printer.

FIG. 5 is a diagram illustrating an example of printer information managed by the printer management unit 352.

A printer ID is an identifier for uniquely identifying the printer 110 registered with the print server 150. A serial number is information similar to the serial number in FIG. 4, and is an identifier of the printer 110. The serial number is a character string uniquely granted by a device vendor, and is unique within the device vendor. However, the printer management unit 352 manages printers 110 of a plurality of device vendors, and thus there can be duplicate serial numbers in the printer information in FIG. 5.

A shared print user ID is an ID of a print user who has been given authorization to use the corresponding printer. The shared print user ID is a user account issued by the print server 150, and is managed by the print user management unit 351.

A redirect setting is information representing a destination to which information such as print data, a print execution date and time, and a print execution result is to be transmitted from the print server 150 when printing is executed using the printer 110 from the client terminal 140 via the print server 150.

FIGS. 6A, 6B, and 6C are diagrams each illustrating an example of an operation screen provided when the device management server 120 is accessed from a desired computer. For example, the screens in FIGS. 6A to 6C are displayed when the device management server 120 is accessed from the client terminal 140 using a web browser.

FIG. 6A is a login screen of the device management server 120. User account information (a user name and a password) to be used for login is managed by the device user management unit 321.

FIG. 6B is a screen displaying information for each user after login. Device information about a device used by the login user is displayed. The device information is managed by the device management unit 322, as illustrated in FIG. 4.

FIG. 6C is a purchase screen for purchasing a new printer.

In a text 601, the user specifies whether to use cloud print, i.e., whether to use the print server 150 according to the present exemplary embodiment in a printer to purchase. A text 602 is displayed only when the cloud print is to be used. In the text 602, the user specifies an account for using the cloud print. The account for using the cloud print is an account of a print user to log in to the print server 150, and is managed by the printer management unit 352 as illustrated in FIG. 5. A text 603 and a button 604 are displayed only in a case where the user already has an account for using the cloud print.

Figure 7:
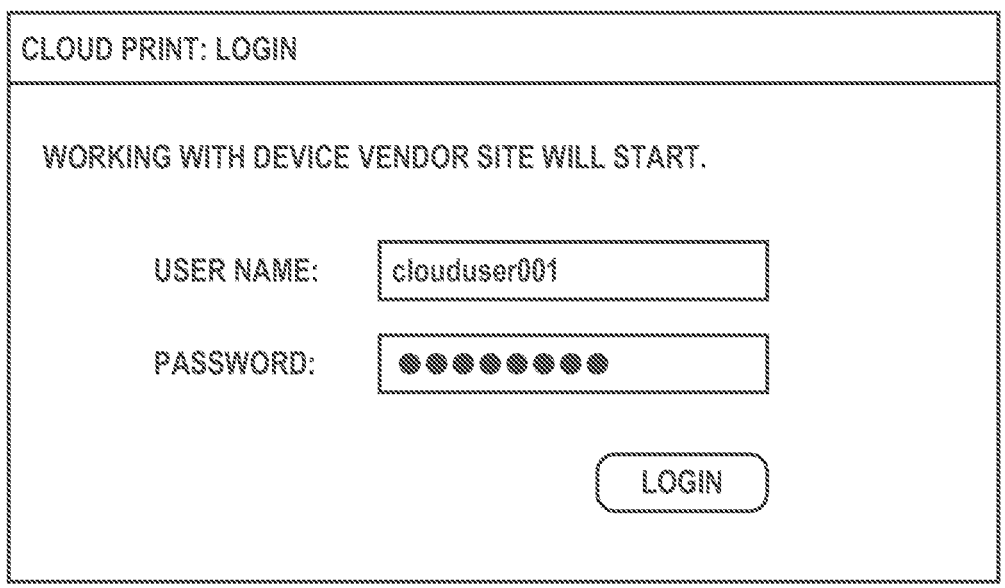
FIG. 7 is a diagram illustrating an example of an operation screen of the print server according to the first exemplary embodiment.

FIG. 7 is a diagram illustrating an example of an operation screen provided from the print server 150 when the button 604 is pressed. When the button 604 is pressed, the print server cooperation unit 323 redirects the web page of the device management server 120 to a web page of the print server 150, and the web browser of the client terminal 140 displays the screen illustrated in FIG. 7. Thereafter, the user inputs account information and logs in to the print server 150, so that the print server cooperation unit 323 acquires authorization information of the print server 150. This authentication cooperation is performed using a known technique such as OAuth.

Figure 8:
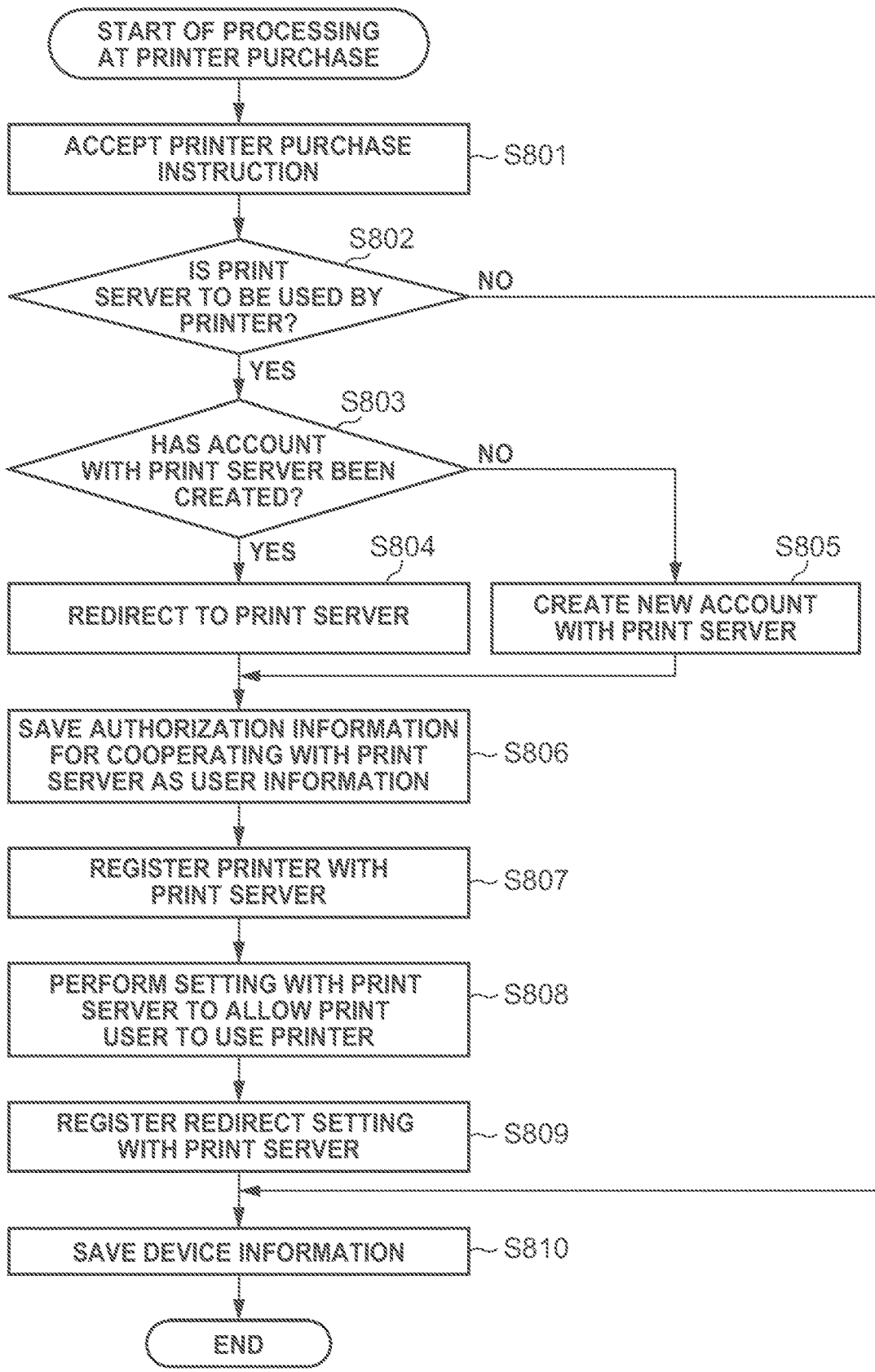
FIG. 8 is a flowchart illustrating an example of device management server processing at the time of printer purchase according to the first exemplary embodiment.

FIG. 8 is a flowchart illustrating an example of processing performed by the device management server 120 when a user purchases the printer 110. The CPU 205 executes processing based on a program stored in the storage device 203 or the memory 204, so that the processing in this flowchart is implemented.

In step S801, the device management server 120 accepts a printer purchase instruction from the user.

In step S802, the device management server 120 determines whether the print server 150 is to be used by the printer to be purchased. In a case where the print server 150 is to be used, i.e., cooperation with the print server 150 is to be performed (YES in step S802), the processing proceeds to step S803. In a case where the print server 150 is not to be used (NO in step S802), the processing proceeds to step S810.

In step S803, the device management server 120 determines whether the user has an account with the print server 150. In a case where an account has been created (YES in step S803), the processing proceeds to step S804. In a case where an account has not been created (NO in step S803), the processing proceeds to step S805.

In step S804, the device management server 120 redirects the current page to a web page of the print server 150 to prompt the user to log in to the print server 150.

In step S805, the device management server 120 creates a new account with the print server 150.

In step S806, the device management server 120 acquires authorization information associated with the print user who has logged in to the print server 150 in step S804 or step S805, from the print server 150, and saves the acquired authorization information into the device user management unit 321 in association with user information corresponding to the user who has logged in to the device management server 120.

In step S807, the device management server 120 accesses the print server 150 using the above-described authorization information, and makes a request for registration of the purchased printer with the print server 150. In other words, in response to this request, the device information such as the serial number is registered as the printer information illustrated in FIG. 5 in the print server 150.

In step S808, the device management server 120 perform setting with the print server 150 to allow the print user who has logged in in step S804 or step S805 to use the printer 110 registered in step S807. In other words, the device management server 120 registers the shared print user ID, as the printer information illustrated in FIG. 5.

In step S809, the device management server 120 registers a redirect setting with the print server 150 to transfer print data when the printer 110 registered in step S807 is used. In other words, the device management server 120 registers the redirect setting as the printer information illustrated in FIG. 5. The destination of the redirect is a uniform resource locator (URL) indicating the print server cooperation unit 323 of the device management server 120.

In step S810, the device management server 120 saves information about the purchased device into the device management unit 322. In other words, the device management server 120 registers the information about the purchased device as the device information illustrated in FIG. 4.

The print user information of the print server 150 newly created by the device management server 120 in step S805 may be presented to the user on a web user interface (UI), or the user may be notified of the print user information by e-mail or mail.

In a case where the serial number of the printer 110 to be used by the user is not determined immediately after the printer purchase, the processes in and after step S807 may be suspended until the serial number is determined, e.g., until the printer 110 is delivered, or may be performed when the user accesses the device management server 120 using the printer 110 after the delivery as a trigger.

Figure 9:
FIG. 9 is a diagram illustrating an example of an operation screen to be displayed when the client terminal issues an instruction to perform printing according to the first exemplary embodiment.

FIG. 9 is a diagram illustrating an example of an operation screen to be displayed when the client terminal 140 issues an instruction to perform printing. The screen illustrated in FIG. 9 is displayed when the user logs in to the print server 150 from the client terminal 140 using a web browser or a dedicated application.

In the example in FIG. 9, a device with "AAA00001" as a serial number is displayed as an available printer. This is because the device for which "clouduser001" is set as the shared print user ID in FIG. 5 is displayed.

When the printer 110 to execute printing is designated in the screen in FIG. 9, a printing request is transmitted from the printing request unit 341 to the print server 150, and print data is held by the print data management unit 353. Further, a print instruction including the print data is transmitted from the print instruction unit 354 to the print instruction receiving unit 312 of the printer 110, and the print execution unit 313 executes a print process based on the received print data.

Furthermore, the print data management unit 353 transmits print information to the print server cooperation unit 323 of the device management server 120, based on the redirect setting of the printer information illustrated in FIG. 5. The account information of the user who has given the instruction to execute printing, the number of sheets to be printed, print settings, and log information such as job attributes including the execution date and time are recorded in the print information.

The print server cooperation unit 323 saves the received print information into the device management unit 322.

According to the first exemplary embodiment, it is possible to provide a device management system that can reduce a load in device installation, by automatically performing setting for a cloud print service based on information available at the time of printer purchase.

In a second exemplary embodiment, configurations similar to those illustrated in FIG. 1 to FIG. 7 and FIG. 9 in the first exemplary embodiment are applied, and portions similar to those in the first exemplary embodiment will be provided with the same reference numerals as those in the first exemplary embodiment and will not be described. A point different from the first exemplary embodiment will be mainly described below.

FIG. 10 is a diagram illustrating an example of device information managed by a device management unit 322 according to the present exemplary embodiment.

The example in FIG. 10 differs from the example in FIG. 4 in that information indicating a user type is added.

The user type is information indicating whether the user ID is an individual account or a corporate account. In general, the corporate account is an account issued by a device vendor based on a contract with a company.

FIG. 11 is a diagram illustrating an example of printer information managed by a printer management unit 352 according to the present exemplary embodiment. The example in FIG. 11 differs from the example in FIG. 5 in that information indicating a print method is added.

The print method is information indicating whether to use push-print or pull-print in a printer as a print process.

In the case of the push-print, when a printing request is transmitted from a client terminal 140, printing is executed automatically by a printer 110 for print data transmitted via a print server 150, as described in the first exemplary embodiment.

On the other hand, in the case of the pull-printing, when a print instruction for print data is transmitted from the client terminal 140, the print instruction is held on the print server 150, and the print data is in a held state. In this state, for example, an operation for authentication using an integrated circuit (IC) card or for making a printing request by a user is performed on the printer 110. A request that is based on this operation is transmitted to the print server 150, so that, in response to this request, the printer 110 acquires the held print data of the user from the print server 150, and executes printing based on the acquired print data. The pull-print may be implemented by transferring the print data which is held on the print server 150 to suspend printing to a device management server 120, and holding this data on the device management server 120.

In this case, the printing request from the printer 110 is transmitted to the device management server 120 directly or via the print server 150.

In the case of the push-print, the operation for authentication using the IC card or for making the printing request by the user on the printer 110 performed in the pull-print is omitted.

FIG. 12 is a flowchart illustrating an example of processing performed by the device management server 120 in a case where a user purchases the printer 110. A point different from FIG. 8 is that processes in step S1201 to 1203 are added.

In step S1201, the device management server 120 determines whether the account of the user who has purchased the device is a corporate account. In a case where the account is a corporate account (YES in step S1201), the processing proceeds to step S1202. In a case where the account is an individual account (NO in step S1201), the processing proceeds to step S1203.

In step S1202, the device management server 120 requests the print server 150 to set the pull-print to be used when the device is used via the print server 150. The example in FIG. 10 indicates that a device with "DDD00001" as a serial number is a printer purchased using a corporate account. Further, in the example in FIG. 11, a device with "cloudprinter006" as a printer ID (i.e., the device with "DDD00001" as a serial number) is registered with a setting for using the pull-print.

In step S1203, the device management server 120 requests the print server 150 to set the push-print to be used when the device is used via the print server 150.

Instead of being automatically determined based on the account type, the print method may be selected in the screen in FIG. 6C, and the initial value of the selected state may be switched depending on the account type.

According to the second exemplary embodiment, use of the pull-print is set at the time of printer purchase based on a contract with a company, so that, even in a case where the printer 110 is installed in an organization and used by a plurality of individuals, the timing for outputting a print product can be controlled, and the cloud print service can be used while retaining adequate security.

Other Exemplary Embodiments

Embodiments of the present disclosure also include an apparatus or system configured by appropriately combining the above-described exemplary embodiments, and a method thereof.

Here, embodiments of the present disclosure include an apparatus or system that executes one or more pieces of software (programs) that implements the functions of the above-described exemplary embodiments. Embodiments of the present disclosure also include a method for implementing the above-described exemplary embodiments that is executed in the apparatus or system. The program is supplied to the system or apparatus via a network or any of various storage mediums, and the program is read into one or more memories and executed by one or more computers (such as a CPU and a micro processing unit (MPU)) of the system or apparatus. In other words, embodiments of the present disclosure also include the program itself and any of various storage mediums readable by the computer storing this program. Embodiments of the present disclosure can also be implemented by a circuit (e.g., an application specific integrated circuit (ASIC)) that implements the functions of the above-described exemplary embodiments.

According to the exemplary embodiments of the present disclosure, it is possible to provide a device management system capable of reducing a load in device installation, by automatically performing setting for a cloud print service based on information available at the time of printer purchase.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-003450, filed Jan. 13, 2022, which is hereby incorporated by reference herein in its entirety.

What is claimed is:

1. A device management server configured to cooperate with a print server, the device management server comprising:
   one or more processors; and
   one or more memories storing instructions, which when executed by the one or more processors, cause the device management server to:
      accept an operation of purchasing a printer using first account information managed by the device management server;
      accept designation indicating that cooperation with the print server is to be performed when the printer to be purchased is used; and
      make a request for registration of device information about the printer to be purchased with the print server, using authorization information,
   wherein the device management server provides a print service having a print method in which printing on the purchased printer is executed by transmitting print data held on the device management server in response to a printing request from the purchased printer, and
   wherein, in a case where a print process using the purchased printer based on second account information is executed in the print server after the registration of the device information, print log information of the print process is transmitted from the print server to the device management server.

2. The device management server according claim 1, wherein the print process in the print server is implemented by designating the purchased printer and providing an instruction to perform printing using the purchased printer after a login using the second account information is performed from a client terminal.

3. The device management server according claim 1, wherein the instructions, when executed by the one or more processors, cause the device management server to make a request to the print server for setting the print method for the purchased printer.

4. The device management server according claim 3, wherein a method in which printing is executed by transmitting print data held on the print server or the device management server in response to a printing request from a printer is set as the print method.

5. The device management server according claim 1, wherein the instructions, when executed by the one or more processors, cause the device management server to manage the authorization information acquired based on an operation performed using the second account information managed by the print server in association with the first account information, and
   wherein the request for the registration of the device information is performed using the managed authorization information.

6. The device management server according claim 1, wherein the print log information includes information about a number of sheets used to print print data that the purchased printer receives from the print server not via the device management server.

7. A control method of a device management server configured to cooperate with a print server, the control method comprising:
   performing first acceptance of accepting an operation of purchasing a printer, using first account information managed by the device management server;
   performing second acceptance of accepting designation indicating that cooperation with the print server is to be performed when the printer to be purchased is used; and
   making a request for registration of device information about the printer to be purchased with the print server, using permission information,
   wherein the device management server provides a print service having a print method in which printing on the purchased printer is executed by transmitting print data held on the device management server in response to a printing request from the purchased printer, and
   wherein, in a case where a print process using the purchased printer based on second account information is executed in the print server after the registration of the device information, print log information of the print process is transmitted from the print server to the device management server.

* * * * *